United States Patent
Kasper

(10) Patent No.: US 11,623,624 B2
(45) Date of Patent: Apr. 11, 2023

(54) SYSTEM AND METHOD FOR BRAKE SIGNAL DETECTION

(71) Applicant: Bendix Commercial Vehicle Systems LLC, Elyria, OH (US)

(72) Inventor: Phillip J Kasper, Elyria, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 538 days.

(21) Appl. No.: 16/804,486

(22) Filed: Feb. 28, 2020

(65) Prior Publication Data

US 2021/0269006 A1    Sep. 2, 2021

(51) Int. Cl.
| | |
|---|---|
| G08G 1/16 | (2006.01) |
| B60T 13/66 | (2006.01) |
| B60T 7/04 | (2006.01) |
| G05D 1/02 | (2020.01) |
| G08G 1/00 | (2006.01) |

(52) U.S. Cl.
CPC ............ B60T 13/665 (2013.01); B60T 7/042 (2013.01); G05D 1/0293 (2013.01); *B60T 2220/04* (2013.01); *G08G 1/22* (2013.01)

(58) Field of Classification Search
CPC .......... G08G 1/20; G08G 1/22; G05D 1/0295; G05D 1/0293; B60T 7/12; B60T 7/22; B60T 2201/02; B60T 13/665; B60T 7/042; B60T 2220/04
See application file for complete search history.

(56) References Cited

U.S. PATENT DOCUMENTS

| | | | |
|---|---|---|---|
| 5,295,551 A * | 3/1994 | Sukonick | ................. B62D 1/28 180/167 |
| 7,499,774 B2 | 3/2009 | Barrett et al. | |
| 8,744,666 B2 | 6/2014 | Switkes et al. | |
| 9,091,558 B2 | 7/2015 | Su et al. | |
| 9,293,044 B2 | 3/2016 | Chen | |
| 10,017,039 B1 * | 7/2018 | Colavincenzo | ....... B60W 10/04 |
| 2013/0041576 A1 * | 2/2013 | Switkes | ................. G01C 22/00 701/123 |

(Continued)

FOREIGN PATENT DOCUMENTS

| | | |
|---|---|---|
| CN | 101172481 A | 5/2008 |
| CN | 102227612 A | 10/2011 |
| WO | 2013006826 A2 | 1/2013 |

*Primary Examiner* — Bradley T King

(74) *Attorney, Agent, or Firm* — Brian E. Kondas; Cheryl L. Greenly

(57) ABSTRACT

A controller in a first vehicle includes an electrical input port adapted to receive a first electrical signal, based on a presence of a first service brake demand associated with a first brake valve on the first vehicle, and a second electrical signal, based on a presence of a second service brake demand associated with a second brake valve on the first vehicle. The controller is capable of determining if at least one of the first electrical signal and the second electrical signal indicates the respective presence of the first service brake demand and the second service brake demand. An electrical output port is adapted to transmit an electrical deceleration signal based on the presence of the at least one of the first service brake demand and the second service brake demand. A speed reducing mechanism on a second vehicle is applied based on the electrical deceleration signal.

23 Claims, 4 Drawing Sheets

(56) References Cited

U.S. PATENT DOCUMENTS

| | | | |
|---|---|---|---|
| 2016/0152216 A1* | 6/2016 | Spath | B60T 8/1708 |
| | | | 701/70 |
| 2016/0231746 A1 | 8/2016 | Hazelton et al. | |
| 2017/0076599 A1 | 3/2017 | Gupta et al. | |
| 2017/0227972 A1* | 8/2017 | Sabau | G05D 1/024 |
| 2018/0015873 A1* | 1/2018 | Brubaker | B60T 7/042 |
| 2018/0113476 A1* | 4/2018 | Giles | G05D 1/0295 |
| 2018/0188725 A1* | 7/2018 | Cremona | G08G 1/22 |
| 2018/0308365 A1* | 10/2018 | Liu | G05D 1/0293 |
| 2019/0084534 A1* | 3/2019 | Kasper | B60T 7/20 |
| 2019/0084537 A1* | 3/2019 | Kasper | B60T 8/17551 |
| 2019/0206261 A1* | 7/2019 | Szymczak | G08G 1/0112 |
| 2019/0355259 A1* | 11/2019 | Kruppa | G08G 1/22 |
| 2019/0385461 A1* | 12/2019 | Blomstrand | B62D 53/0864 |
| 2020/0035104 A1* | 1/2020 | Bergquist | H04W 4/46 |
| 2021/0318694 A1* | 10/2021 | Abrosimov | B61L 27/40 |

\* cited by examiner

SYSTEM AND METHOD FOR BRAKE SIGNAL DETECTION

BACKGROUND

The present invention relates to a platoon of vehicles. It finds particular application in conjunction with communicating braking commands between vehicles in the platoon and will be described with particular reference thereto. It will be appreciated, however, that the invention is also amenable to other applications.

It is known that two or more vehicles moving along a roadway can cooperate as a road train or a "platoon" for mutually providing various efficiency benefits to the vehicles within the platoon. A typical vehicle platoon includes a leader vehicle and at least one follower vehicle arranged serially along a single roadway lane. The participating vehicles cooperate to maintain a relatively short distance between adjacent vehicles by exchanging deceleration (e.g., braking) commands and other signals. To maintain safety, it is critical that a brake application (e.g., either a manual service brake application initiated by an operator of the vehicle, or an automated service brake application initiated by an automated system of the vehicle) on one of the platooning vehicles is detected by an electronic controller on the braking vehicle and, furthermore, a braking notification signal is transmitted as soon as possible to at least one of the follower vehicles so that the at least one follower vehicle can initiate braking to avoid a collision with a vehicle in front of the at least one follower vehicle.

Currently, service brake demand and, consequently, service brake application is sensed by a pressure transducer associated with a foot brake valve. Typical manual service brake applications result in sensing via this pressure transducer. However, other manual service brake applications (e.g., initiated by movement of a hand control valve) and automated service brake applications are not sensed by the pressure transducer since, for example, these other manual and automated service brake applications are pneumatically coupled further downstream. Therefore, service brake demand and/or service brake application are not sensed in all situations.

It is appreciated that in typical usage, the brake demand sensed at a foot brake valve is used to control an associated vehicle. In other cases (e.g. trailer hand control usage), sensing the application may lead to alternate control such as dissolving the platoon.

The present invention provides a new and improved apparatus and method for sensing all manual and automatic service brake applications.

SUMMARY

A controller in a first vehicle includes an electrical input port adapted to receive a first electrical signal, based on a presence of a first service brake demand associated with a first brake valve on the first vehicle, and a second electrical signal, based on a presence of a second service brake demand associated with a second brake valve on the first vehicle. The controller is capable of determining if at least one of the first electrical signal and the second electrical signal indicates the respective presence of the first service brake demand and the second service brake demand. An electrical output port is adapted to transmit an electrical deceleration signal based on the presence of the at least one of the first service brake demand and the second service brake demand. A speed reducing mechanism on a second vehicle is applied based on the electrical deceleration signal.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
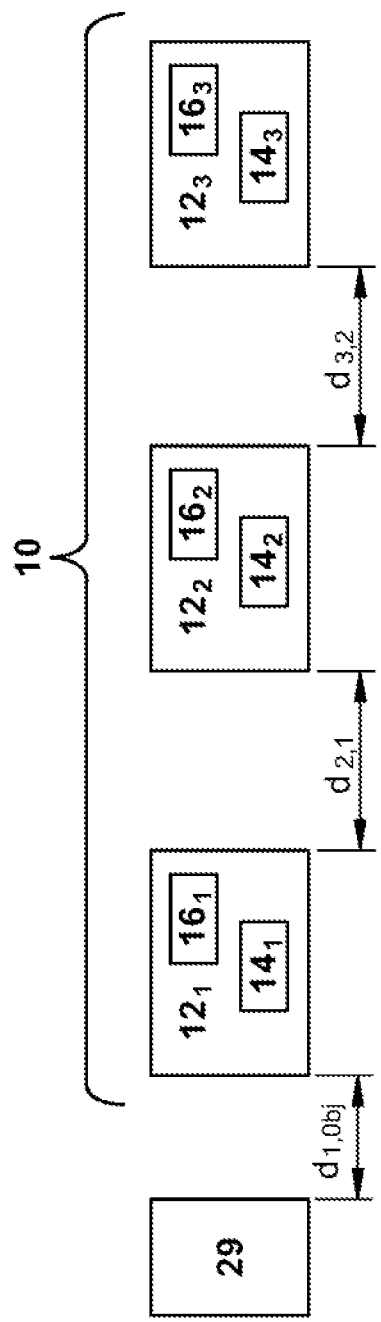
FIG. 1 illustrates a schematic representation of a platoon of vehicles in accordance with one embodiment of an apparatus illustrating principles of the present invention.

With reference to FIG. 1, a simplified component diagram of an exemplary platoon 10 including a plurality of vehicles 12 is illustrated in accordance with one embodiment of the present invention. In the illustrated embodiment, the platoon 10 includes three (3) vehicles $12_{1,2,3}$ (e.g., a first vehicle $12_1$, a second vehicle $12_2$ and a third vehicle $12_3$ (collectively 12)). The first vehicle $12_1$ is a leader vehicle of the platoon 10. The second vehicle $12_2$, which is positioned behind the first vehicle $12_1$ and in front of the third vehicle $12_3$, is a first follower vehicle of the platoon 10. The third vehicle $12_3$, which is positioned in front of the second vehicle $12_2$, is a second follower vehicle of the platoon 10. Each of the vehicles 12 includes a respective brake system $14_{1,2,3}$ (e.g., a first brake system $14_1$, a second brake system 142 and a third brake system $14_3$ (collectively 14)).

Figure 2:
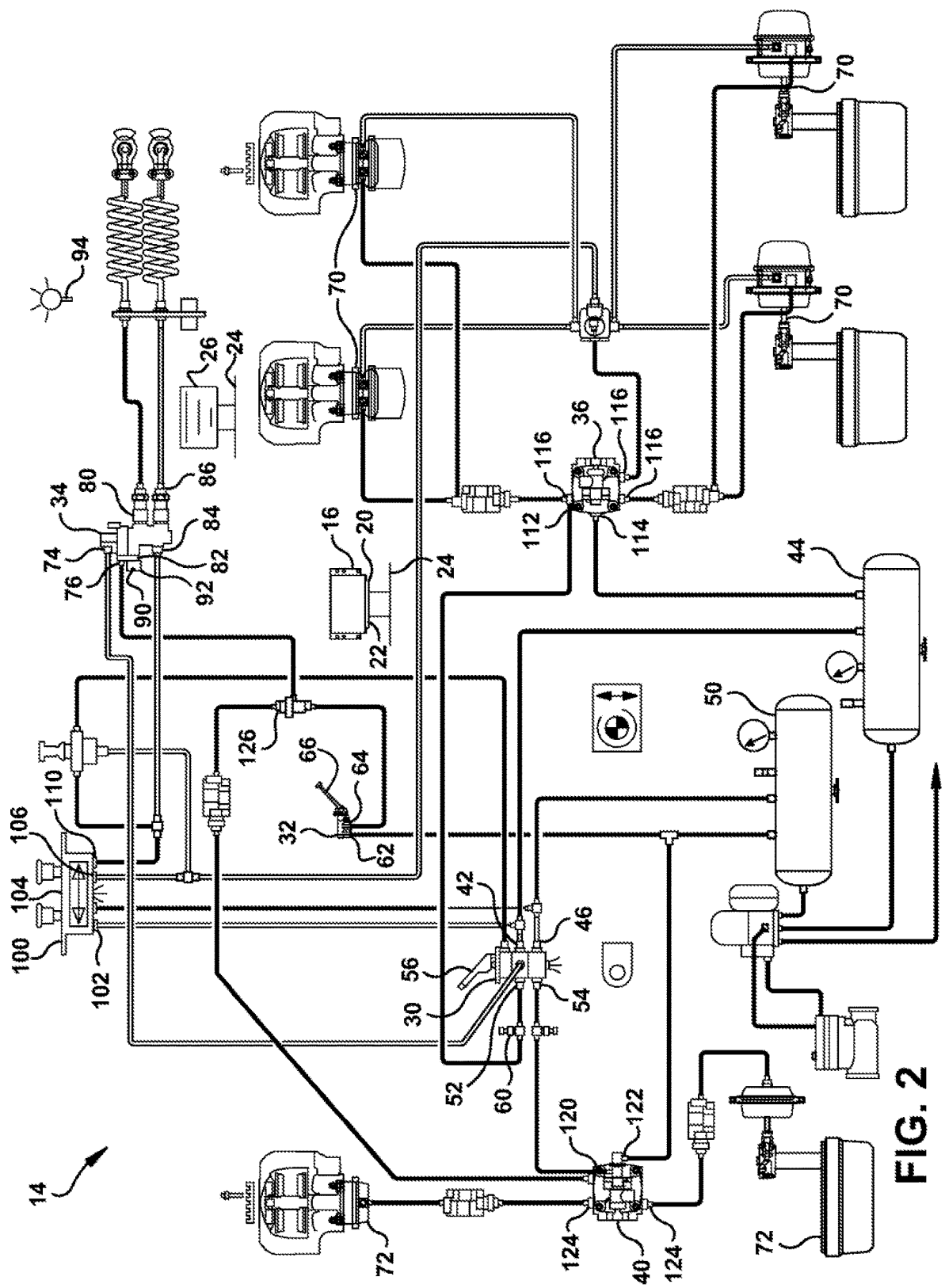
FIG. 2 illustrates a schematic representation of a braking system in accordance with one embodiment of an apparatus illustrating principles of the present invention.

FIG. 2 is an exemplary component diagram representing each of the brake systems $14_{1,2,3}$ on the respective vehicles $12_{1,2,3}$. Since the brake systems $14_{1,2,3}$ on the respective vehicles $12_{1,2,3}$ are substantially identical, only a single figure is included to illustrate the representative brake system, which is referred to generally as 14.

With reference to FIGS. 1 and 2, each of the vehicles $12_{1,2,3}$ includes a respective electronic control unit (ECU) $16_{1,2,3}$ (e.g., a first ECU $16_1$ on the first vehicle $12_1$, a second ECU $16_2$ on the second vehicle $12_2$ and a third ECU $16_3$ on the third vehicle $12_3$ (collectively 16)). For purposes of discussion, each of the ECU's 16 is also referred to as a respective controller. In one embodiment, the ECU's $16_{1,2,3}$ are brake controllers and are part of the respective brake systems $14_{1,2,3}$ on the vehicles $12_{1,2,3}$. In other embodiments, the ECU's $16_{1,2,3}$ are not part of the respective brake systems $14_{1,2,3}$. Each of the ECU's 16 includes a respective electrical input port $20_{1,2,3}$ (e.g., an input port $20_1$ on the first vehicle $12_1$, an input port $20_2$ on the second vehicle $12_2$ and an input port $20_3$ on the third vehicle $12_3$ (collectively, 20)) and a respective electrical output port $22_{1,2,3}$ (e.g., an output port $22_1$ on the first vehicle $12_1$, an output port $22_2$ on the second vehicle $12_2$ and an output port $22_3$ on the third vehicle $12_3$ (collectively, 22)). The input and output ports 20, 22, respectively, electrically communicate with a vehicle data bus 24 (e.g., a J1939 bus). A respective antenna $26_{1,2,3}$ on each of the vehicles $12_{1,2,3}$ electrically communicates with the ECU $16_{1,2,3}$ via, for example, the vehicle data bus $24_{1,2,3}$.

Respective radar systems $28_{1,2,3}$ (collectively, 28) are included on the vehicles $12_{1,2,3}$. Each of the radar systems 28 determines a distance to a respective forward object and transmits an electrical signal based on that distance to the input port 20 of the ECU 16 on the respective vehicle 12 via, for example, the vehicle data bus 24. In the illustrated embodiment, the radar system $28_1$ determines a distance $d_{Obj,1}$ between the first vehicle $12_1$ and a first forward object 29 and transmits an electrical signal based on that distance $d_{1,Obj}$ to the input port $20_1$ of the ECU $16_1$ on the first vehicle $12_1$; the radar system $28_2$ determines a distance $d_{2,1}$ between the second vehicle $12_2$ and a second forward object (e.g., the first vehicle $12_1$) and transmits an electrical signal based on that distance $d_{2,1}$ to the input port $20_2$ of the ECU $16_2$ on the second vehicle $12_2$; and the radar system $28_3$ determines a distance $d_{3,2}$ between the third vehicle $12_3$ and a third forward object (e.g., the second vehicle $12_2$) and transmits an electrical signal based on that distance $d_{3,2}$ to the input port $20_3$ of the ECU $16_3$ on the third vehicle $12_3$. In one embodiment, the electrical signal transmitted by the radar system $28_1$ to the input port $20_1$ of the ECU $16_1$ represents the distance $d_{1,Obj}$ between the first vehicle $12_1$ and the first forward object 29; the electrical signal transmitted by the radar system $28_2$ to the input port $20_2$ of the ECU $16_2$ represents the distance $d_{2,1}$ between the second vehicle $12_2$ and the first vehicle $12_1$; and the electrical signal transmitted by the radar system $28_3$ to the input port $20_3$ of the ECU $16_3$ represents the distance $d_{3,2}$ between the third vehicle $12_3$ and the second vehicle $12_2$.

The brake system 14 includes a foot brake valve 30, a hand brake valve 32, a tractor protection valve 34, a first antilock traction relay valve 36 and a second antilock traction relay valve 40.

The foot brake valve 30 includes a first pneumatic supply port 42, fluidly communicating with a first source 44 (e.g., reservoir) of compressed air, and a second pneumatic supply port 46 fluidly communicating with a second source 50 (e.g., reservoir) of compressed air. The foot brake valve 30 also includes a first pneumatic delivery port 52 and a second pneumatic delivery port 54. The foot brake valve 30 is actuated when an associated foot brake pedal 56 is depressed by, for example, an operator of the respective vehicle 12.

A pressure sensor 60 fluidly communicates with the first pneumatic delivery port 52. The pressure sensor 60 measures a pneumatic pressure at the first pneumatic delivery port 52 and transmits an electronic signal based on the measured pneumatic pressure. For example, the pressure sensor 60 transmits an electronic signal when the measured pneumatic pressure at the first pneumatic delivery port 52 is above a threshold pressure (e.g., ~3 psi), which indicates the foot brake valve 30 is actuated. It is contemplated that the pressure sensor 60 electrically communicates with the vehicle bus 24, and that the electronic signal based on the measured pneumatic pressure is transmitted to the ECU input port 20 via the bus 24. However, other embodiments, in which the pressure sensor 60 electrically communicates directly with the ECU input port 20, are also contemplated. Theoretically, the pneumatic pressures in the first and second pneumatic delivery ports 52, 54 are substantially equal. Therefore, although only a single pressure sensor 60 is illustrated for measuring the pneumatic pressure at the first pneumatic delivery port 52, it is to be understood that a pressure sensor measuring the pneumatic pressure at the second pneumatic delivery port 54 may be used instead of, or in addition to, the single pressure sensor 60 measuring the pneumatic pressure at the first pneumatic delivery port 52.

The hand brake valve 32 includes a pneumatic supply port 62, which fluidly communicates with the second reservoir 50, and a pneumatic delivery port 64. The hand brake valve 32 is actuated when an associated hand brake control 66 (e.g., a handle) is moved from an unactuated position to an actuated position by, for example, the operator of the respective vehicle 12. The hand brake valve 32 is considered to be actuated when the handle 66 is in the actuated position to allow the pneumatic supply port 62 to fluidly communicate with the pneumatic delivery port 64 and pneumatic pressure above a threshold pressure (e.g., ~3 psi) is present at the pneumatic delivery port 64, which indicates the hand brake valve 32 is actuated.

Each of the vehicles 12 also includes a controller—either the ECU 16 or another ECU on the vehicle 12—that controls an engine on the respective vehicle 12 to act as an engine brake (e.g., an engine retarder). The ECU 16 (or whichever ECU on the vehicle 12 controls the engine to act as an engine brake or retarder), the foot brake valve 30, the hand brake valve 32, rear service brakes 70 and/or the front service brakes 72 act as speed reducing mechanism(s) on the respective vehicle 12.

The tractor protection valve 34 includes a primary tractor pneumatic control port 74, a secondary tractor pneumatic control port 76, a trailer pneumatic control port 80, a stop light switch pneumatic delivery port 82, a tractor pneumatic supply port 84, and a trailer pneumatic supply port 86. The primary and secondary tractor control ports 74, 76, respectively, receive pneumatic fluid into the tractor protection valve 34, while the trailer control port 80 delivers pneumatic fluid from the tractor protection valve 34. The tractor supply port 84 receives pneumatic fluid into the tractor protection valve 34, while the trailer supply port 80 delivers pneumatic fluid from the tractor protection valve 34. The stop light switch delivery port 82 delivers pneumatic fluid from the tractor protection valve 34 for actuating an associated stop light switch 90. A stop light switch sensor 92 transmits an electronic signal to the vehicle bus 24 when the stop light switch 90 is actuated for illuminating a brake light 94 (e.g., stop light). In one embodiment, the ECU 16 receives the electronic signal from the vehicle bus 24 indicating the stop light switch 90 is actuated and determines the service brakes 72, 70 are actuated based on activation of the stop light switch 90.

A control module 100 includes first and second supply ports 102, 104 that fluidly communicate with first and second reservoirs 44, 50, respectively, a tractor delivery port 106 and a trailer delivery port 110. For purposes of the embodiments of the present invention discussed herein, it is assumed the control module 100 is set to a state such that the first and second supply ports 102, 104 fluidly communicate with the tractor delivery port 106 and the trailer delivery port 110. In this state, pneumatic pressure at the first and second supply ports 102, 104 is delivered to the tractor delivery port 106 and the trailer delivery port 110.

The first traction relay valve 36 includes a pneumatic control port 112, a pneumatic supply port 114, which fluidly communicates with the first reservoir 44, and a pneumatic delivery port 116. The second traction relay valve 40 includes a pneumatic control port 120, a pneumatic supply port 122, which fluidly communicates with the second reservoir 50, and a pneumatic delivery port 124.

The foot brake valve first delivery port 52 fluidly communicates with both the first traction relay valve control port 112 and the tractor protection valve primary tractor control port 74. The foot brake valve second delivery port 54 fluidly communicates with the second traction relay valve control port 120. The first traction relay valve delivery ports 116 fluidly communicate with the rear tractor service brakes 70. The hand brake valve delivery port 64 fluidly communicates with the tractor protection valve secondary tractor control port 76 via a double-check valve 126. The second traction relay valve delivery ports 124 fluidly communicate with both of the front tractor service brakes 72 and the secondary tractor control port 76 via the double-check valve 126.

The rear brakes 70 are actuated by pneumatic fluid communicated from the first reservoir 44 via the foot brake valve 30 and the first traction relay valve 36 when the pedal 56 is depressed. Similarly, the front brakes 72 are actuated by pneumatic fluid communicated from the second reservoir 50 via the foot brake valve 30 and the second traction relay valve 40 when the pedal 56 is depressed.

The pneumatic fluid having a relatively higher pressure at either the second traction relay valve delivery port 124 or the hand control valve delivery port 64 is fluidly communicated by the double check valve 126 to the tractor protection valve secondary tractor control port 76.

The brake light 94 on the vehicle 12 is controlled by the stop light switch 90 based on the pneumatic pressure at the trailer control port 80 of the tractor protection valve 34. For example, if the pneumatic pressure present at at least one of the primary and secondary tractor control ports 74, 76, respectively, is above a tractor protection valve threshold (e.g., about 3 psi), the tractor protection valve 34 is considered to be actuated and the brake light switch 90 is set to an on position to activate the brake light 94.

It is contemplated that the brake light switch 90 is a digital or analog pressure switch. In one embodiment, the brake light switch 90 is associated with the tractor protection valve 34. For example, in the illustrated embodiment, the brake light switch 90 is integrated with the tractor protection valve 34. Other embodiments, are also contemplated in which the brake light switch 90 is not integrated with the tractor protection valve 34.

The electrical input port $20_1$ is electrically connected to the brake light switch 90. The electrical input port 20 receives a signal (e.g., an electrical signal) from the brake light switch 90 when the brake light 94 is activated (e.g., when at least one of the foot brake valve 30 is actuated and the hand brake valve 32 is actuated). If the signal at the electrical input port 20 is present, the ECU 16 transmits a signal to the antenna 26 via the electrical output port 22 and the data bus 24. Upon receiving the signal from the electrical output port 22, the antenna 26 transmits a signal indicating the vehicle 12 is braking.

Figure 3A:
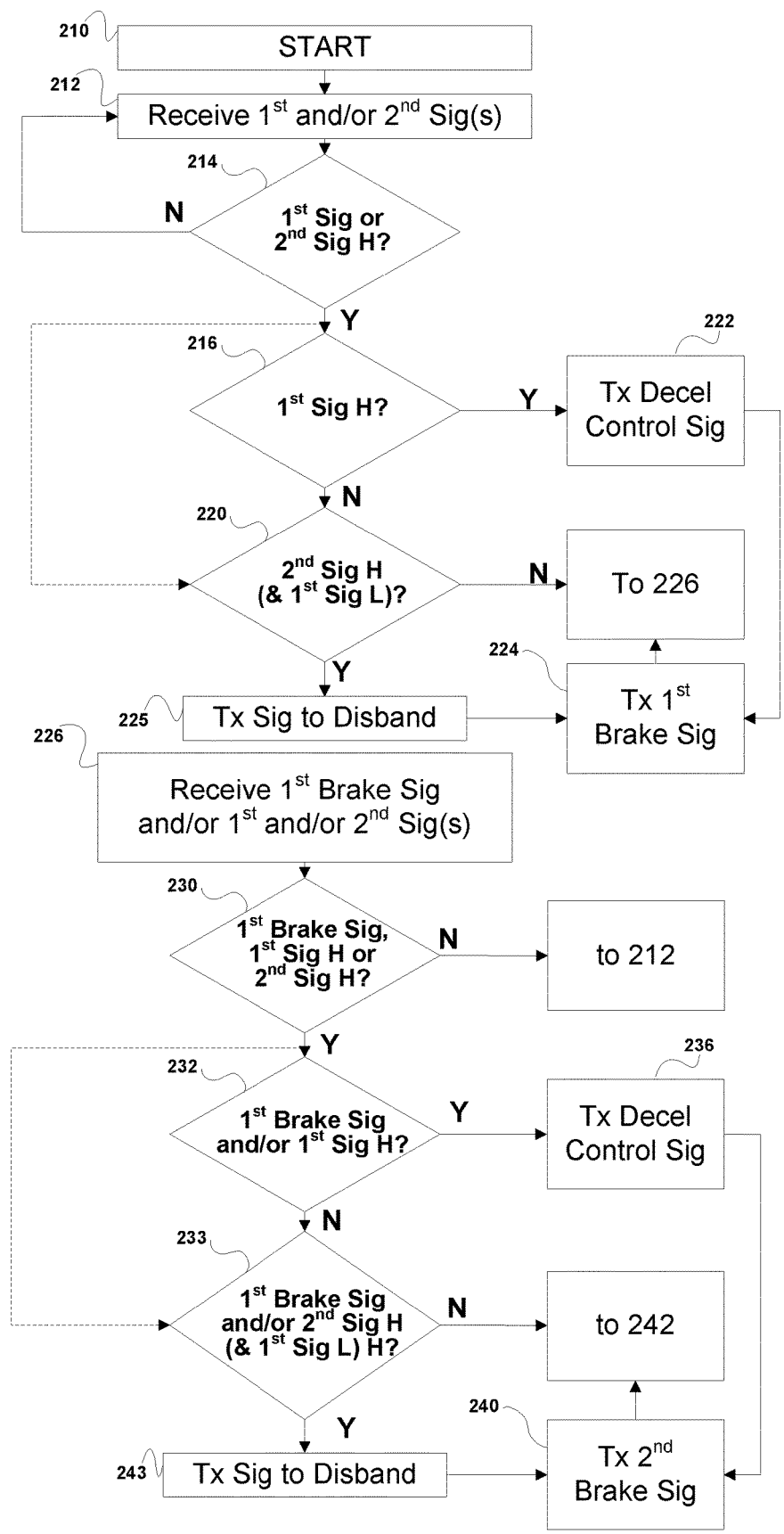
FIGS. 3a and 3b are an exemplary methodology of detecting a braking signal and controlling a platoon in accordance with one embodiment illustrating principles of the present invention.
Figure 3B:
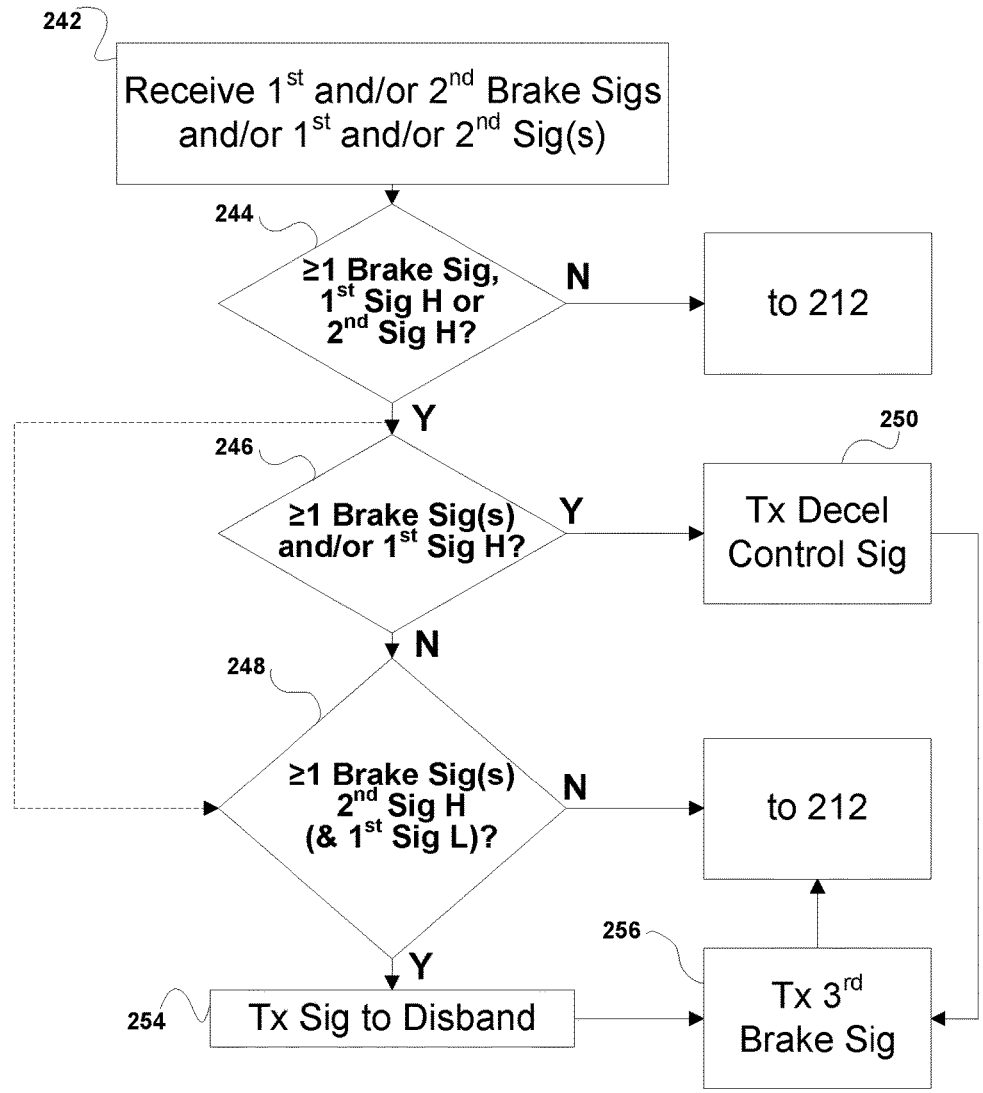

With reference to FIGS. 3a and 3b, an exemplary methodology of the system shown in FIGS. 1 and 2 for detecting a braking signal and controlling a platoon is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1, 2, 3a and 3b, the method starts in a step 210. The ECU input port $20_1$ receives, in a step 212, a first vehicle first electrical signal from the first vehicle pressure sensor $60_1$ and/or a first vehicle second electrical signal from the stop light switch sensor $92_1$. In one embodiment, the first electrical signal is either a "low" (L) electrical signal (e.g., <~2 Volts), which indicates the foot brake valve 30 is not actuated, or a "high" (H) electrical signal (e.g., >~4 Volts), which indicates the foot brake valve 30 is actuated, the second electrical signal is similarly either a "low" (L) electrical signal, which indicates the hand brake valve 32 is not actuated, or a "high" (H) electrical signal, which indicates the hand brake valve 32 is actuated.

In a step 214, a determination is made whether at least one of the first vehicle first electrical signal and the first vehicle second electrical signal is identified as high. If neither the first vehicle first electrical signal nor the first vehicle second electrical signal is identified as high in the step 214, control returns to the step 212; otherwise, control passes to a step (as indicated by a dashed line).

In the step, a determination is made whether the first vehicle first electrical braking deceleration signal is high, in which case control passes to a step 222; otherwise, control passes to the step.

In the step 222, the first vehicle ECU $16_1$ transmits a deceleration control signal to decelerate the first vehicle $12_1$. The deceleration control signal transmitted in the step 222 causes the first vehicle $12_1$ to decelerate by automatically activating the first vehicle traction relay valves $36_1$, $40_1$ and/or a first vehicle engine brake (not shown). Then, in a step 224, the first vehicle ECU $16_1$ transmits a first electrical braking deceleration signal from the first vehicle ECU output port $22_1$, which, as discussed in more detail below, is received by the ECU input ports $20_{2,3}$ of the other vehicles $12_{2,3}$, respectively, in the platoon 10. Control then passes to a step 226.

In the step, a determination is made if the first vehicle second electrical braking deceleration signal is high and, optionally if the first vehicle first electrical braking deceleration signal is low (e.g., if control passed directed from the step 214 to the step), in which case control passes to a step 225; otherwise, control passes to the step 226.

In the step 225, the first vehicle ECU $16_1$ transmits a signal, via the first vehicle output port $22_1$, to the other vehicles $12_{2,3}$ in the platoon 10 that the first vehicle $12_1$ is disbanding (e.g., dissolving or terminating) the platoon 10; control then passes to the step 224 for transmitting the first electrical braking deceleration signal from the first vehicle ECU output port $22_1$. Optionally, in the step 224, the radar system $28_1$ on the first vehicle $12_1$ determines a braking level based on a distance $d_{1,Obj}$ between the first vehicle $12_1$ and the first forward object 29 and/or a relative velocity of the first vehicle $12_1$ with respect to the first forward object 29. For example, if the relative velocity indicates the first vehicle $12_1$ is getting closer to the first forward object 29 (e.g., the relative velocity is <0) and/or the distance between the first vehicle $12_1$ and the first forward object 29 is decreasing, the first vehicle $12_1$ is braked according to a progression of control (e.g., first, remove all or part of throttle; second, activate retarder partially or fully; third, apply brakes partially or fully) based on the relative velocity and/or the distance between the first vehicle $12_1$ and the first forward object 29. Control then passes to the step 226.

In the step 226, the second vehicle ECU input port $20_2$ receives i) the first electrical brake signal and/or ii) a second vehicle first electrical signal from the second vehicle pressure sensor $60_2$ and/or a second vehicle second electrical signal from the stop light switch sensor $92_2$. In a step 230, a determination is made whether at least one of i) the first electrical brake signal is received and ii) at least one of the second vehicle first electrical signal and the second vehicle second electrical signal is identified as high. If neither the first electrical brake signal is received nor at least one of the second vehicle first electrical signal and the second vehicle second electrical signal is identified as high in the step 230, control returns to the step 212; otherwise, control passes to a step (as indicated by a dashed line).

In the step, a determination is made whether at least one of i) the first electrical brake signal was received and ii) the second vehicle first electrical braking deceleration signal is high, in which case control passes to a step 236; otherwise, control passes to the step.

In the step 236, if the first electrical brake signal is the braking status signal, the second vehicle ECU $16_2$ determines the first vehicle $12_1$ is braking based on receiving the braking status signal (e.g., the braking status signal is only transmitted when at least one of the foot brake valve $30_1$ and the hand brake valve $32_1$ is actuated on the first vehicle $12_1$); therefore, the second vehicle ECU $16_2$ transmits a deceleration control signal to decelerate the second vehicle $12_2$ after determining the status of the foot brake valve $30_1$ and the hand brake valve $32_1$ on the first vehicle $12_1$. Otherwise, if the first brake electrical signal is the braking deceleration signal, the second vehicle ECU $16_2$ immediately acts upon the received braking deceleration signal and transmits a deceleration control signal in the step 236 to decelerate the second vehicle $12_2$ without first determining the status of the foot brake valve $30_1$ and the hand brake valve $32_1$ on the first vehicle $12_1$. The deceleration control signal transmitted in the step 236 causes the second vehicle $12_2$ to decelerate by automatically activating the second vehicle traction relay valves $36_2$, $40_2$ and/or a second vehicle engine brake (not shown). Control then passes to a step 240, which is discussed in more detail below.

In the step, a determination is made if at least one of i) the first electrical brake signal was received and ii) the second vehicle second electrical braking deceleration signal is high and, optionally if the first electrical braking deceleration signal is low (e.g., if control passed directed from the step 230 to the step), in which case control passes to a step 243; otherwise, control passes to a step 242.

In the step 243, the second vehicle ECU $16_2$ transmits a signal, via the second vehicle output port $22_2$, to the other vehicles $12_{1,3}$ in the platoon 10 that the second vehicle $12_2$ is disbanding (e.g., dissolving or terminating) the platoon 10; control then passes to the step 240. In the step 240, the second vehicle ECU $16_2$ transmits a second electrical braking deceleration signal from the second vehicle ECU output port $22_2$, which is received by the ECU input ports $20_{1,3}$ of the other vehicles $12_{1,3}$, respectively, in the platoon 10. Optionally, in the step 240, the radar system $28_2$ on the second vehicle $12_2$ determines a braking level based on the distance $d_{2,1}$ between the second vehicle $12_2$ and the first vehicle $12_1$ and a relative velocity of the second vehicle $12_2$ with respect to the first vehicle $12_1$. For example, if the relative velocity if >0, the second vehicle $12_2$ is braked according to a progression of control (e.g., first, remove all or part of throttle; second, activate retarder partially or fully; third, apply brakes partially or fully based on relative velocity and distance). Control then passes to the step 242.

In the step 242, the third vehicle ECU input port $20_3$ receives i) the first electrical brake signal, ii) the second electrical brake signal and/or iii) a third vehicle first electrical signal from the third vehicle pressure sensor $60_3$ and/or a third vehicle second electrical signal from the stop light switch sensor 923. In a step 244, a determination is made if at least one of i) the first electrical brake signal is received, ii) the second electrical brake signal is received and iii) at least one of the third vehicle first electrical signal and the third vehicle second electrical signal is high. If neither the first nor second electrical brake signal is received nor at least one of the third vehicle first electrical signal and the third vehicle second electrical signal is identified as high in the step 244, control returns to the step 212; otherwise, control passes to a step (as indicated by a dashed line).

In the step, a determination is made whether at least one of i) the first electrical brake signal was received and ii) the third vehicle first electrical braking deceleration signal is high, in which case control passes to a step 250; otherwise, control passes to the step.

In the step 250, if the second brake electrical signal is the braking status signal, the third vehicle ECU $16_3$ determines the second vehicle $12_2$ is braking based on receiving the braking status signal (e.g., the braking status signal is only transmitted when at least one of the foot brake valve $30_2$ and the hand brake valve $32_2$ is actuated on the second vehicle $12_2$); therefore, the third vehicle ECU $16_3$ transmits a deceleration control signal to decelerate the third vehicle $12_3$ after determining the status of the foot brake valve $30_2$ and the hand brake valve $32_2$ on the second vehicle $12_2$. Otherwise, if the second brake electrical signal is the braking deceleration signal, the third vehicle ECU $16_3$ immediately acts upon the received braking deceleration signal and transmits a deceleration control signal in the step 250 to decelerate the third vehicle $12_3$ without first determining the status of the foot brake valve $30_2$ and the hand brake valve $32_2$ on the second vehicle $12_2$. The deceleration control signal transmitted in the step 250 causes the third vehicle $12_3$ to decelerate by automatically activating the third vehicle traction relay valves $36_3$, $40_3$ and/or a third vehicle engine brake (not shown). Control then returns to the step 212.

In the step, a determination is made if at least one of i) the first electrical brake signal was received and ii) the third vehicle second electrical braking deceleration signal is high and, optionally if the first electrical braking deceleration signal is low (e.g., if control passed directed from the step 244 to the step), in which case control passes to a step 254; otherwise, control then returns to the step 212.

In the step 254, the third vehicle ECU $16_3$ transmits a signal, via the third vehicle output port $22_3$, to the other vehicles $12_{1,2}$ in the platoon 10 that the third vehicle $12_3$ is disbanding (e.g., dissolving or terminating) the platoon 10; control then passes to a step 256. In the step 256, the third vehicle ECU $16_3$ transmits a third electrical braking deceleration signal from the third vehicle ECU output port $22_3$, which is received by the ECU input ports $20_{1,2}$ of the other vehicles $12_{1,2}$, respectively, in the platoon 10. Optionally, in the step 256, the radar system $28_3$ on the third vehicle $12_3$ determines a braking level based on the distance $d_{3,2}$ between the third vehicle $12_3$ and the second vehicle $12_2$ and a relative velocity of the third vehicle $12_3$ with respect to the second vehicle $12_2$. For example, if the relative velocity if >0, the third vehicle $12_3$ is braked according to a progression of control (e.g., first, remove all or part of throttle; second, activate retarder partially or fully; third, apply brakes partially or fully based on relative velocity and distance). Control then returns to the step 212.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A controller in a first vehicle, comprising:
   an electrical input port adapted to receive a first electrical signal, based on a presence of a first service brake demand associated with a first brake valve on the first vehicle, and a second electrical signal, based on a presence of a second service brake demand associated with a second brake valve on the first vehicle, the controller being capable of determining if at least one of the first electrical signal and the second electrical signal indicates the respective presence of the first service brake demand and the second service brake demand; and
   an electrical output port adapted to transmit an electrical deceleration signal based on the presence of the at least one of the first service brake demand and the second service brake demand, a second controller on a second vehicle applying a speed reducing mechanism on the second vehicle based on the electrical deceleration signal;
   wherein:
      the second vehicle is in a vehicle platoon behind the first vehicle;
      the first electrical signal is an analog signal;
      the second electrical signal is a digital signal;
      the first service brake demand is present when the analog signal indicates a first control associated with the first brake valve is actuated beyond a first threshold;
      the second service brake demand is present when the digital signal indicates a second control associated with the second brake valve is actuated beyond a second threshold; and
      if the analog signal indicates the first service brake demand is not present and the digital signal indicates the second service brake demand is present, a platoon termination signal is transmitted from the electrical output port to a controller on the second vehicle for terminating the vehicle platoon.

2. The controller as set forth in claim 1, wherein the electrical deceleration signal is transmitted to activate the speed reducing mechanism on the second vehicle if at least one of the first electrical signal and the second electrical signal indicates the respective presence of the first service brake demand and the second service brake demand.

3. The controller as set forth in claim 1, wherein the first service brake demand is present when the first electrical signal indicates a first control associated with the first brake valve is actuated beyond a first threshold.

4. The controller as set forth in claim 1, wherein the first service brake demand is present when a first service brake demand pressure of at least about 3 psi is delivered from the first brake valve.

5. The controller as set forth in claim 1, wherein the second service brake demand is present when the second electrical signal indicates a second control associated with the second brake valve is actuated beyond a second threshold.

6. The controller as set forth in claim 1, wherein the second service brake demand is present when a second service brake demand pressure delivered of at least about 3 psi is delivered from the second brake valve.

7. The controller as set forth in claim 1, wherein the second service brake demand is present when an electrical stop lamp signal is present for activating an associated stop lamp on the first vehicle.

8. A method for activating a speed reducing mechanism on a second vehicle, the method comprising:
   receiving a first analog electrical signal based on a presence of a first service brake demand associated with a first brake valve on a first vehicle;
   receiving a second digital electrical signal based on a presence of a second service brake demand associated with a second brake valve on the first vehicle;
   determining if the first electrical signal and the second electrical signal indicates the respective presence of at least one of the first service brake demand and the second service brake demand, the first service brake demand being present when the analog signal indicates a first control associated with the first brake valve is actuated beyond a first threshold, and the second service brake demand being present when the digital signal indicates a second control associated with the second brake valve is actuated beyond a second threshold;
   transmitting an electrical braking signal based on the first electrical signal and the second electrical signal;
   activating the speed reducing mechanism on a second vehicle based on the electrical braking signal, the second vehicle being in a platoon behind the first vehicle; and
   if the analog signal indicates the first service brake demand is not present and the digital signal indicates the second service brake demand is present, transmitting a platoon termination signal a the second vehicle for terminating the vehicle platoon.

9. The method for activating a speed reducing mechanism on a second vehicle set forth in claim 8, further including:
   activating the speed reducing mechanism on the second vehicle if at least one of the first electrical signal and the second electrical signal indicates the respective presence of the first service brake demand and the second service brake demand.

10. The method for activating a speed reducing mechanism on a second vehicle set forth in claim 8, further including:
    determining the first service brake demand is present when the first electrical signal indicates a first control associated with the first brake valve is actuated beyond a first threshold.

11. The method for activating a speed reducing mechanism on a second vehicle set forth in claim 10, further including:
    determining the first service brake demand is present when the first electrical signal indicates the first control associated with the first brake valve is actuated beyond the first threshold of at least about 3 psi.

12. The method for activating a speed reducing mechanism on a second vehicle set forth in claim 8, further including:
    determining the second service brake demand is present when the second electrical signal indicates a second control associated with the second brake valve is actuated beyond a second threshold.

13. The method for activating a speed reducing mechanism on a second vehicle set forth in claim 12, further including:

determining the second service brake demand is present when the second electrical signal indicates the second control associated with the second brake valve is actuated beyond the second threshold of at least about 3 psi.

14. The method for activating a speed reducing mechanism on a second vehicle set forth in claim 8, further including:
   determining the second service brake demand is present when an electrical stop lamp signal is present for activating an associated stop lamp on the first vehicle.

15. A system for controlling a speed reducing mechanism on a second vehicle based on braking on a first vehicle, the system comprising:
   a first controller on the first vehicle, the first controller including:
      a first electrical input port adapted to receive a first vehicle first electrical signal, based on a presence of a first vehicle first service brake demand associated with a first vehicle first brake valve, and a first vehicle second electrical signal based on a presence of a first vehicle second service brake demand associated with a first vehicle second brake valve, the first controller being capable of determining if at least one of the first vehicle first electrical signal and the first vehicle second electrical signal indicates the respective presence of the first vehicle first service brake demand and the first vehicle second service brake demand; and
      a first electrical output adapted to transmit a first electrical deceleration signal based on the presence of at least one the first vehicle first service brake demand and the first vehicle second service brake demand; and
   a second controller on the second vehicle, the second controller including:
      a second electrical input port adapted to receive the first electrical deceleration signal; and
      a second electrical output port adapted to transmit a second electrical deceleration signal based on the first electrical deceleration signal, a second vehicle deceleration mechanism being activated based on the second electrical deceleration signal;
   wherein:
      the second vehicle is in a vehicle platoon behind the first vehicle;
      if the first vehicle first electrical signal indicates the first vehicle first service brake demand is not present and the first vehicle second electrical signal indicates the second service brake demand is present:
         the first controller transmits, via the first electrical output port, a signal to the second vehicle that the platoon is terminated; and
         the second electrical deceleration signal is also based on a second vehicle radar signal transmitted from a second vehicle radar, the second vehicle radar signal being based on at least one of i) a relative velocity of the second vehicle with respect to the first vehicle and ii) a distance between the first vehicle and the second vehicle.

16. The system as set forth in claim 15, further including a third controller on a third vehicle, the third controller including:
   a third electrical input port adapted to receive at least one of the first electrical deceleration signal and the second electrical deceleration signal; and
   a third electrical output port adapted to transmit a third electrical deceleration signal based on the first electrical deceleration signal and the second electrical deceleration signal, a third vehicle deceleration mechanism being activated based on the third electrical deceleration signal.

17. The system as set forth in claim 16, wherein:
   the second vehicle is a following vehicle relative to the first vehicle; and
   the third vehicle is a following vehicle relative to the first vehicle and the second vehicle.

18. The system as set forth in claim 15, wherein:
   the second electrical input port is adapted to receive a second vehicle first electrical signal, based on a presence of a second vehicle first service brake demand associated with a second vehicle first brake valve, and a second vehicle second electrical signal based on a presence of a second vehicle second service brake demand associated with a second vehicle second brake valve, the second controller being capable of determining if at least one of the second vehicle first electrical signal and the second vehicle second electrical signal indicates the respective presence of the second vehicle first service brake demand and the second vehicle second service brake demand; and
   the second electrical output port is adapted to transmit the second electrical braking deceleration signal based on the second vehicle first electrical signal and the second vehicle second electrical signal.

19. The system as set forth in claim 18, wherein:
   the second vehicle is in a vehicle platoon behind the first vehicle;
   if the second electrical input port receives at least one of the second vehicle first electrical signal and the second vehicle second electrical signal, the second electrical deceleration signal is transmitted to apply the second vehicle deceleration mechanism; and
   if the second electrical input port receives at least one of the second vehicle first electrical signal and the second vehicle second electrical signal, the second controller transmits, via the second electrical output port, a signal to the first vehicle that the platoon is terminated.

20. The system as set forth in claim 15, wherein:
   the first electrical deceleration signal is transmitted to apply the brakes on the second vehicle if at least one of the first vehicle first electrical signal and the first vehicle second electrical signal indicates the respective presence of at least one of the first vehicle first service brake demand and the first vehicle second service brake demand.

21. The system as set forth in claim 15, wherein:
   the second vehicle is in a vehicle platoon behind the first vehicle;
   if the first vehicle first electrical signal indicates the first vehicle first service brake demand is not present and the first vehicle second electrical signal indicates the second service brake demand is present:
      the first controller transmits, via the first electrical output port, a signal to the second vehicle that the platoon is terminated; and
      the second electrical deceleration signal is also based on a second vehicle radar signal transmitted from a second vehicle radar, the second vehicle radar signal being based on at least one of i) a relative velocity of the second vehicle with respect to the first vehicle and ii) a distance between the first vehicle and the second vehicle.

22. A system for controlling a speed reducing mechanism on a second vehicle based on braking on a first vehicle, the system comprising:
- a first controller on the first vehicle, the first controller including:
  - a first electrical input port adapted to receive a first vehicle first analog electrical signal, based on a presence of a first vehicle first service brake demand associated with a first vehicle first brake valve, and a first vehicle second digital electrical signal based on a presence of a first vehicle second service brake demand associated with a first vehicle second brake valve, the first controller being capable of determining if at least one of the first vehicle first analog electrical signal and the first vehicle second digital electrical signal indicates the respective presence of the first vehicle first service brake demand and the first vehicle second service brake demand; and
  - a first electrical output adapted to transmit a first vehicle electrical brake status signal based on the presence of at least one the first vehicle first service brake demand and the first vehicle second service brake demand; and
- a second controller on the second vehicle in a platoon behind the first vehicle, the second controller including:
  - a second electrical input port adapted to receive the first vehicle electrical brake status signal; and
  - a second electrical output port adapted to transmit a second electrical deceleration signal based on the first vehicle electrical brake status signal, a second vehicle deceleration mechanism being activated based on the second electrical deceleration signal;

wherein:
- the first vehicle first service brake demand is present when the analog signal indicates a first control associated with the first vehicle first brake valve is actuated beyond a first threshold;
- the first vehicle second service brake demand is present when the digital signal indicates a second control associated with the first vehicle second brake valve is actuated beyond a second threshold; and
- if the analog signal indicates the first vehicle first service brake demand is not present and the digital signal indicates the first vehicle second service brake demand is present, a platoon termination signal is transmitted to a controller on the second vehicle for terminating the vehicle platoon.

23. The system as set forth in claim 22, wherein:
the first vehicle electrical brake status signal is transmitted when at least one of the first vehicle first electrical signal and the first vehicle second electrical signal indicates the respective presence of the first service brake demand and the second service brake demand;
upon receiving the first vehicle electrical brake status signal, the second controller on the second vehicle determines at least one of the first service brake demand and the second service brake demand is present;
the second controller on the second vehicle transmits the second electrical deceleration signal, after determining at least one of the first service brake demand and the second service brake demand is present, to activate the speed reducing mechanism on the second vehicle.

* * * * *